No. 879,506.

PATENTED FEB. 18, 1908.

G. A. WHITE.
AUTOMATIC BRAKE FOR KNITTING MACHINES.
APPLICATION FILED MAY 8, 1907.

2 SHEETS—SHEET 1.

Witnesses.
S. H. Clarke
P. J. Egan

Inventor.
George A. White.
By James Shepard
Atty.

No. 879,506. PATENTED FEB. 18, 1908.
G. A. WHITE.
AUTOMATIC BRAKE FOR KNITTING MACHINES.
APPLICATION FILED MAY 8, 1907.
2 SHEETS—SHEET 2.
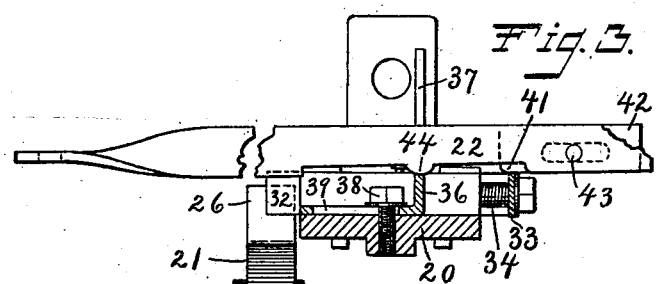
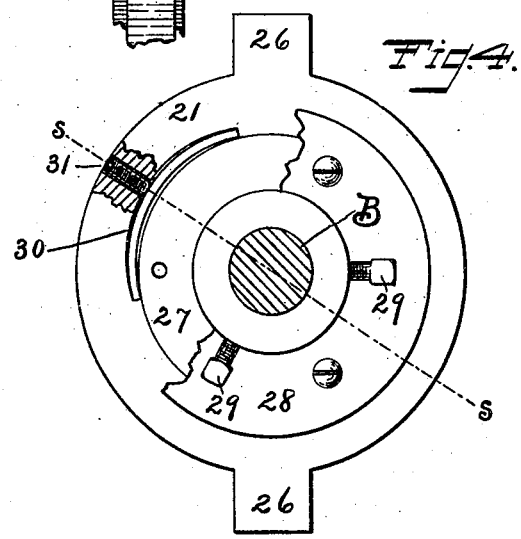
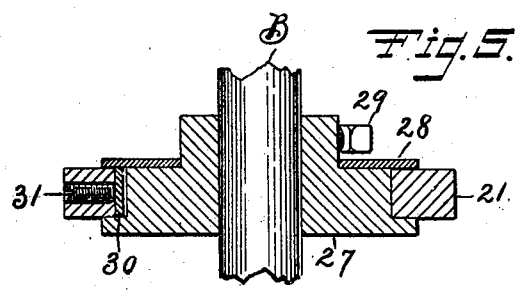
Witnesses.
S. H. Clarke
P. J. Egan
Inventor.
George A. White.
By James Shepard
Atty.

UNITED STATES PATENT OFFICE.

GEORGE A. WHITE, OF BRISTOL, CONNECTICUT.

AUTOMATIC BRAKE FOR KNITTING-MACHINES.

No. 879,506.

Specification of Letters Patent.

Patented Feb. 18, 1908.

Application filed May 8, 1907. Serial No. 372,563.

*To all whom it may concern:*

Be it known that I, GEORGE A. WHITE, a citizen of the United States, residing at Bristol, in the county of Hartford and State of Connecticut, have invented certain new and useful Improvements in Automatic Brakes for Knitting-Machines, of which the following is a specification.

My invention relates to improvements in automatic brakes for knitting machines, and the main object of my improvement is to automatically release the brake as soon as the machine stops.

Figure 1:
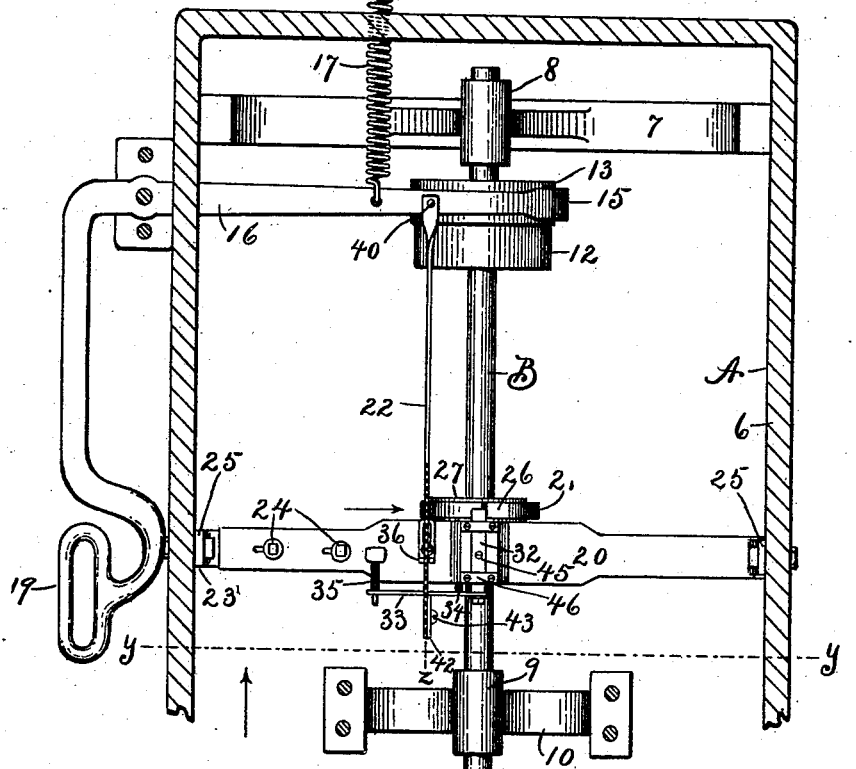
Figure 2:
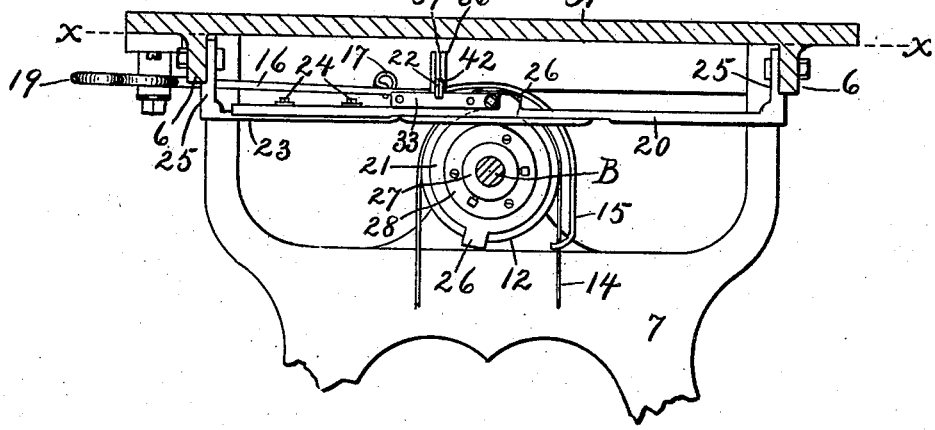

In the accompanying drawing:—Figure 1 is a sectional plan view of my brake and so much of a knitting machine as is necessary to show its connection therewith. The plane of section is indicated by the line $x\ x$ in Fig. 2. Fig. 2 is a sectional side elevation of the same, on the line $y\ y$ of Fig. 1. Fig. 3 is an enlarged sectional view, on the line $z$ of Fig. 1, showing the principal parts of my brake attachment. Fig. 4 is a sectional side elevation of my friction brake. Fig. 5 is a sectional view thereof on the line $s\ s$ of Fig. 4, a portion of the shaft being shown in elevation.

While my brake may be used upon any machine to which it is applicable, it is more particularly designed for use on knitting machines. I have shown the same as applied to an ordinary or well known form of knitting machine table that is designed to have placed thereon two circular knitting frames. The drawings show only one end or half of the said table A, and the driving shaft B for one of the said circular frames. The said table has on its under side a box-like flange 6 to which any suitable legs 7 may be secured in any ordinary manner. The bearing or box 8 for one end of the shaft B may be mounted on the legs at the ends of the table, while the other end of the said shaft is mounted in a box 9 on the bracket 10 that is secured in any suitable manner to the under side of the table. The shaft B is also provided with a bevel gear 11 for engaging a bevel gear and vertical shaft not shown, for driving the circular frame. The said shaft B is provided with fast and loose pulleys 12 and 13 for the application of a driving belt 14 to drive the machine.

A shipper 15 is formed or mounted on one end of the shipper lever 16, for shifting the belt from one pulley to the other, the said lever being pulled or operated in one direction by a spring 17 connected by one end to the shipper lever and by its other end to a fixed support 18, and in the other direction by means of the attendant who moves the said lever by the handle 19. The shipper is shown in Fig. 1, in a position to shift and hold the belt on the loose pulley 13. When the operator pulls the shipper lever handle forward, the belt is shifted to the fast pulley and the spring 17 is put under increased tension, so that it will pull the shipper lever in the direction to shift the belt to the loose pulley as soon as the shipper lever is released.

The parts thus far described are all old and in practice the shipper lever is secured in its position for holding the belt on the fast pulley and is automatically released upon the breaking of a thread or yarn, but for the purposes of disclosing my improvement it is immaterial how the shipper lever is released to the force of the spring. My attachment to this old machine consists of a cross arm 20 with parts mounted thereon the said cross arm being secured to the under side of the table, a friction brake 21 mounted on the driving shaft and an operating bar or slide 22 connected to the shipper. The cross arm 20 is provided with an extension slide 23 adjustably secured by a bolt and slot connection 24, so that it may be contracted or lengthened to fit frames or tables of varying widths. Its ends are provided with lugs 25 by means of which it may be bolted or otherwise secured to the flanges 6 of the table underneath the table A, and a little above the shaft B as shown in Figs. 1 and 2. The friction brake 21 is in the form of a ring, having one or more stop arms 26, the ring and arms being frictionally mounted on the hub 27 and plate 28, that are made fast on the shaft B in any suitable manner, as for example, by the set screws 29. The ring is recessed as shown in Figs. 4 and 5 to receive the friction spring or shoe 30 that bears on the periphery of the hub 27 within the ring and the friction of the said spring or shoe on the said hub may be adjusted by means of the set screw 31 in the said ring. This friction brake is mounted on the shaft 8 by one side edge of the cross arm 20 as shown. Upon the said cross arm a sliding bolt 32 is mounted transversely to the said arm, one end of the said bolt being connected with the plate 33, while a spring or springs 34 and 35 are arranged between the said plate and cross arm with a constant tendency to force the said plate away from the cross arm and thereby move the sliding bolt 32 so as to withdraw its ends from engagement with the stop arms 26 of the brake or ring 21. A guide bracket 36, having a slot 37 for the operating bar or slide 22, is adjustably mounted on the cross arm 20 by means of a bolt 38 that passes through a slot 39 in the foot of the said guide bracket. The operating bar or slide 22 is pivoted by one end to the shipper 15 by a pin or bolt 40, Fig. 1, while its opposite end lies in the slot 37 of the guide bracket 36, as best shown in Fig. 3. This end of the said operating bar is provided with a shoulder for engaging the plate 33 of the bolt 32, for moving the said bolt longitudinally against the force of its springs 34 and 35, and in the direction to project the end of the said bolt into the path of the stop arms 26. I prefer to make this shoulder adjustable. This I accomplish by forming the shoulder 41 on the end of a separate plate 42, said plate having a longitudinal slot for the bolt 43 by which it is secured to the side of the operating bar as shown, the slot in the said plate being indicated by broken lines in Fig. 3. The operating bar or slide is also provided with a lifting cam or projection 44, Fig. 3, at its under edge, for engaging a fixed obstruction, as for example the metal at the lower end of the slot 37 in the guide bracket 36.

Some suitable stop device should be provided to limit the withdrawing movement of the sliding bolt 32, and this may be in the form of a pin or screw 45 on the bolt, for engaging some fixed device on the cross arm, as for example the strap 46, Fig. 1, that holds the bolt 32 in its ways. The spring or springs employed to withdraw the sliding bolt 32 should be much lighter than the spring 17 that moves the shipper, in order that these springs for the bolt may be put under tension by the force of the spring 17 when the said spring is moving the shipper and connected parts.

While my brake is designed to be operated by a spring actuated shipper, the mechanism and its operation is the same, whether the shipper is forced to its position relatively to the loose pulley, by a spring, by mechanism, or by hand.

When the shipper is moved to shift the belt upon the fast pulley for driving the shaft B, the operating bar or slide is moved with the shipper far enough to carry the shoulder 41 to the farther side of the plate 33 so that the bar drops down with its shoulder 41 in a lower position than the upper edge of the said plate. When the shipper is operated to shift the belt to the loose pulley, the operating bar 22 is moved with it and the shoulder 41 thereon engages the plate 33 by its upper edge, whereby the said plate and attached bolt 32 are moved with the said shipper and bar so as to project the end of the said bolt into the path of the stop arms 26 of the friction brake. When one of these arms engages the said bolt the rotary movement of the friction brake 21 is stopped, although the driving shaft and hub inside of the said brake may continue their motion for a short time. As the shipper reaches its position over the loose pulley the lifting cam 44 of the operating bar engages the metal at the lower end of the slot 37 in the guide bracket 36, and lifts the said bar far enough to disengage the shoulder 41 from the edge of the plate 33 so as to release the said plate and bolt 32 to the force of their springs 34 and 35, as shown in Fig. 3. So long as the motion of the shaft B continues and presses the stop arm 26 against the bolt 32, there will be so much friction on the said bolt that the springs 34 and 35 will not withdraw it, although the operating bar has released its hold on the bolt. But just as soon as the shaft B stops so that the stop arms no longer bear upon the end of the bolt and hold it, the springs 34 and 35 withdraw the bolt and release the friction brake, so that the operator has to pay no attention to releasing the brake and the machine is ready to repeat the operation hereinbefore described whenever the shipper is again moved for starting and stopping the machine.

By placing the friction brake upon the driving shaft instead of directly on the circular frame there is less liability of breakage and at the same time the machine will be stopped as quick as it is safe to stop it. The action of the brake is wholly automatic, both as to engagement and disengagement, and the operator has only to shift the shipper just exactly the same as it would be shifted if the brake were not present.

I claim as my invention:—

1. The combination of a driving shaft with fast and loose pulleys mounted on the said shaft, a shipper for shifting a belt on the said pulleys, a friction brake mounted on the said shaft and having a stop arm, a sliding bolt adapted to have one end moved into and out of the path of the stop arm of the said friction brake, and an operating bar or slide connected with the said shipper, for projecting the end of the said sliding bolt into the path of the said stop arm when the shipper is operated to shift the belt to the loose pulley.

2. The combination of a driving shaft with fast and loose pulleys mounted thereon, a shipper for shifting a belt on the said pulleys, a friction brake mounted on the said shaft and having a stop arm, a sliding bolt adapted to have one end moved into and out of the path of the said stop arm, a spring for withdrawing the said bolt from the path of the said stop arm, an operating bar or slide connected with the said shipper for acting upon the said bolt for projecting the end of the said bolt into the path of the said stop arm when the shipper is operated to shift the belt to the loose pulley, and means for throwing the said operating bar or slide out of action on the bolt after the end of said bolt has been engaged by the said stop arm.

3. The combination of a frame or table with a driving shaft mounted thereon, mechanism for driving the said shaft, a shipper for putting the driving mechanism into and out of action, a friction brake mounted on the said driving shaft and having a stop arm on its periphery, a cross arm mounted on the said frame adjacent to the said friction brake, a sliding bolt mounted on the said cross arm and adapted to have one end moved into and out of the path of the said stop arm, a spring for moving the said bolt out of the path of the said stop arm, an operating bar or slide connected by one end with the said shipper and having its opposite end guided on the said cross arm, the said bar or slide having a shoulder for engaging a part that moves with the said sliding bolt and also having a lifting cam for engaging a fixed device on the said cross arm for lifting the said bar out of engagement with the said bolt after the said bolt has been projected into the path of the said stop arm.

4. The combination of a driving shaft with mechanism for driving the said shaft, a shipper for putting the said driving mechanism into and out of action, a friction brake comprising a hub fixed upon the said driving shaft, a ring having a stop arm projecting from its periphery and mounted to turn on the said hub and friction applying means between the said hub and ring, a bolt for obstructing the movement of the said ring with its hub, and means connected with the shipper for bringing the said bolt into the path of the stop arm on the said ring.

5. The combination of a driving shaft with mechanism for driving the same, a shipper for putting the driving mechanism into and out of action, a friction brake mounted on the said shaft and having a stop arm, a bolt adapted to have one end moved into and out of the path of the stop arm of the said friction brake, and means connected with the shipper for operating the said bolt for engaging and disengaging the said stop arm.

GEORGE A. WHITE.

Witnesses:
BURTON L. BENNETT,
ARTHUR F. WOODFORD.